United States Patent
Garbe et al.

(10) Patent No.: US 10,657,294 B2
(45) Date of Patent: May 19, 2020

(54) NON-VOLATILE MEMORY WITH PHYSICAL UNCLONABLE FUNCTION

(71) Applicant: NXP B.V., Eindhoven (NL)

(72) Inventors: Christoph Hans Joachim Garbe, Neu Wulmstorf (DE); Soenke Ostertun, Wedel (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/581,855

(22) Filed: Sep. 25, 2019

(65) Prior Publication Data

US 2020/0117836 A1 Apr. 16, 2020

(30) Foreign Application Priority Data

Oct. 15, 2018 (EP) .................................... 18200533

(51) Int. Cl.
*H03K 19/00* (2006.01)
*G06F 21/79* (2013.01)
*H04L 9/08* (2006.01)
*G11C 16/04* (2006.01)

(52) U.S. Cl.
CPC .......... *G06F 21/79* (2013.01); *G11C 16/0433* (2013.01); *H04L 9/0866* (2013.01)

(58) Field of Classification Search
None
See application file for complete search history.

(56) References Cited

U.S. PATENT DOCUMENTS

| | | |
|---|---|---|
| 2016/0148664 A1 | 5/2016 | Katoh et al. |
| 2016/0172011 A1 | 6/2016 | Ioannou et al. |
| 2016/0323096 A1 | 11/2016 | Kara-Ivanov et al. |
| 2017/0222817 A1 | 8/2017 | Wong et al. |
| 2019/0079732 A1* | 3/2019 | Wu .......................... G06F 21/86 |
| 2019/0079878 A1* | 3/2019 | Chen .................... G06F 12/1408 |
| 2019/0371413 A1* | 12/2019 | Okabe .................. G11C 7/1042 |

FOREIGN PATENT DOCUMENTS

| | | |
|---|---|---|
| JP | 2012073954 A | 4/2012 |
| JP | 2018142396 A | 9/2018 |
| WO | 2017/148492 A1 | 9/2017 |

* cited by examiner

*Primary Examiner* — Anh Q Tran

(57) ABSTRACT

In accordance with a first aspect of the present disclosure, a non-volatile memory is provided, comprising: a plurality of storage elements; a plurality of access transistors, said access transistors being connected to one or more of said storage elements; a measurement unit, wherein said measurement unit is configured to measure a variation between electrical characteristics of said access transistors; a processing unit configured to use said variation between electric characteristics as a physical unclonable function. In accordance with a second aspect of the present disclosure, a corresponding method of manufacturing a non-volatile memory is conceived.

15 Claims, 3 Drawing Sheets

NON-VOLATILE MEMORY WITH PHYSICAL UNCLONABLE FUNCTION

CROSS-REFERENCE TO RELATED APPLICATIONS

This application claims priority under 35 U.S.C. § 119 to European Patent Application No. 18200533.0, filed on Oct. 15, 2018, the contents of which are incorporated by reference herein.

TECHNICAL FIELD

The present disclosure relates to a non-volatile memory. In addition, the present disclosure relates to a corresponding method of manufacturing a non-volatile memory.

BACKGROUND

Many semiconductor products contain important data which should be kept secret, for instance codes for encryption or identification. Examples are chips in banking cards, for ticketing or pay TV applications. Chips which are used in such fields have to be security certified to guarantee a certain security standard. Sufficient counter measures against all kinds of attacks which aim at retrieval of codes or uncontrolled change of functionality should be implemented.

SUMMARY

In accordance with a first aspect of the present disclosure, a non-volatile memory is provided, comprising: a plurality of storage elements; a plurality of access transistors, said access transistors being connected to one or more of said storage elements; a measurement unit, wherein said measurement unit is configured to measure a variation between electrical characteristics of said access transistors; a processing unit configured to use said variation between electric characteristics as a physical unclonable function.

In an embodiment, the measurement unit is configured to measure the variation between electrical characteristics by comparing currents through access transistors with the same gate voltage.

In an embodiment, the measurement unit is configured to measure the variation between electrical characteristics by connecting gate voltages of the access transistors to drain voltages of the access transistors and forcing a predefined current through the access transistors.

In an embodiment, the measurement unit is configured to measure the variation between electrical characteristics by comparing, between access transistors, voltages for conducting a predefined current.

In an embodiment, the electric characteristics are the threshold voltages of the access transistors.

In an embodiment, the measurement unit is configured to measure a variation between electrical characteristics of a subset of said access transistors.

In an embodiment, said subset is defined in read-only memory (ROM) code.

In an embodiment, the access transistors are N-type metal-oxide-semiconductor (NMOS) transistors.

In an embodiment, the processing unit is further configured to apply redundancy to the measured variation between electrical characteristics.

In an embodiment, applying said redundancy comprises applying an error correction scheme to the measured variation between electrical characteristics.

In an embodiment, the processing unit is further configured to generate an encryption key based on the physical unclonable function.

In an embodiment, each access transistor is connected in series with one or more of said storage elements.

In an embodiment, the memory is a flash memory.

In an embodiment, a security device comprises the memory of any preceding claim.

In accordance with a second aspect of the present disclosure, a method of manufacturing a non-volatile memory is conceived, the method comprising: providing the non-volatile memory with a plurality of storage elements; providing the non-volatile memory with a plurality of access transistors, said access transistors being connected to one or more of said storage elements; providing the non-volatile memory with a measurement unit, wherein said measurement unit is configured to measure a variation between electrical characteristics of said access transistors; providing the non-volatile memory with a processing unit, wherein the processing unit is configured to use said variation between electrical characteristics as a physical unclonable function.

DESCRIPTION OF DRAWINGS

Embodiments will be described in more detail with reference to the appended drawings, in which.

DESCRIPTION OF EMBODIMENTS

Figure 1:
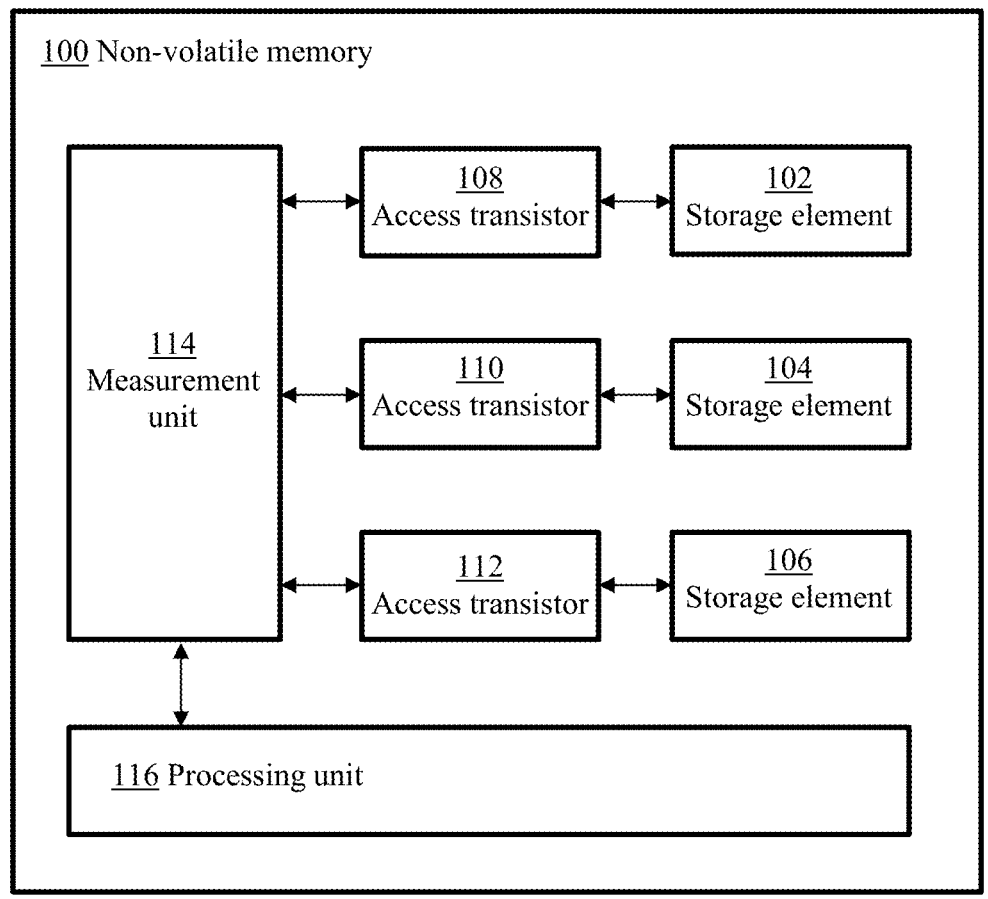
FIG. 1 shows an illustrative embodiment of a non-volatile memory.

Many semiconductor products contain important data which should be kept secret, for instance codes for encryption or identification. Examples are chips in banking cards, for ticketing or pay TV applications. Chips which are used in such fields have to be security certified to guarantee a certain security standard. Sufficient counter measures against all kinds of attacks which aim at retrieval of codes or uncontrolled change of functionality should be implemented.

One security requirement is that memory contents should be encrypted, in a read-only memory (ROM) as well as in a non-volatile memory (NVM). Physical methods aiming at reading out flash data are usually destructive, and only a part of the memory content may be discovered. In order to prevent the possibility to piece data parts together which are obtained from different dies, the encryption should be different for each die. The required die-individual encryption keys are usually stored in the flash memory itself or inside other non-volatile memories.

This method is not an optimal solution, because a die-individual encryption key should first be read out of the NVM, so that it has to be placed into a defined location, which is a weakness. If it is possible to read out the complete flash content of one chip, such data could be copied to a virgin die which would create a working clone. With data from more than one die it might even be possible to break the encryption.

From a security point of view, it is much better to obtain this die-individual key from a location outside of the NVM.

At the same time, it should not be possible to read this key from outside. This excludes fuses or similar storage elements.

A solution which uses random variations of any devices or features that are present inside a semiconductor product is preferred to obtain a so-called physical unclonable function (PUF). Of course, for normal design purposes it is favorable to keep such variations as small as possible, in contrast to the basic idea of a PUF.

One known solution is to use the mismatch inside static random-access memory (SRAM) cells. However, this is not an optimal solution. The mismatch is not large enough to get a high percentage of cells which show a preferred state after power-up in a repeatable way. After all, transistors in SRAM cells are intentionally made longer than necessary to reduce mismatch. This means that a large redundancy is needed to reliably obtain the same data. This is made a lot worse if different conditions are considered, such as temperature and supply voltage. Another problem is that physical mechanisms can change the result over time. A known drawback is negative-bias temperature instability (NBTI), which shifts the device threshold of P-type metal-oxide-semiconductor (PMOS) transistors if a static voltage is applied at the gate. This enforces the writing of the opposite state into such an SRAM cell, after the startup content has been read out. That in turn may offer a possibility for attackers to read out the content of the SRAM.

Consequently, such an SRAM PUF needs a separate SRAM block which cannot be used otherwise and will not be very small, in addition to a rather complex logic part which extracts the correct data using the mentioned high redundancy. Now discussed are a non-volatile memory and a corresponding method of manufacturing a non-volatile memory for increasing the level of security of chips of the kind set forth.

In accordance with the present disclosure, a non-volatile memory is provided, the memory comprising: a plurality of storage elements; a plurality of access transistors, said access transistors being connected to one or more of said storage elements; a measurement unit, wherein said measurement unit is configured to measure a variation between electrical characteristics of said access transistors; and a processing unit configured to use said variation between electrical characteristics as a physical unclonable function. In this way, the security level of the memory may be increased, at a relatively low cost and complexity.

FIG. 1 shows an illustrative embodiment of a non-volatile memory 100. The memory 100 comprises a plurality of storage elements 102, 104, 106, and a plurality of access transistors 108, 110, 112 connected to said storage elements 102, 104, 106. Furthermore, the memory 100 comprises a measurement unit 114 configured to measure a variation between electrical characteristics of said access transistors 108, 110, 112. In addition, the memory 100 comprises a processing unit 116 configured to use the variation between electrical characteristics as a physical unclonable function (PUF). The storage elements 102, 104, 106 may be implemented as transistors that are connected in series with the access transistors 108, 110, 112. The non-volatile memory 100 may be a flash memory, for example.

Figure 2:
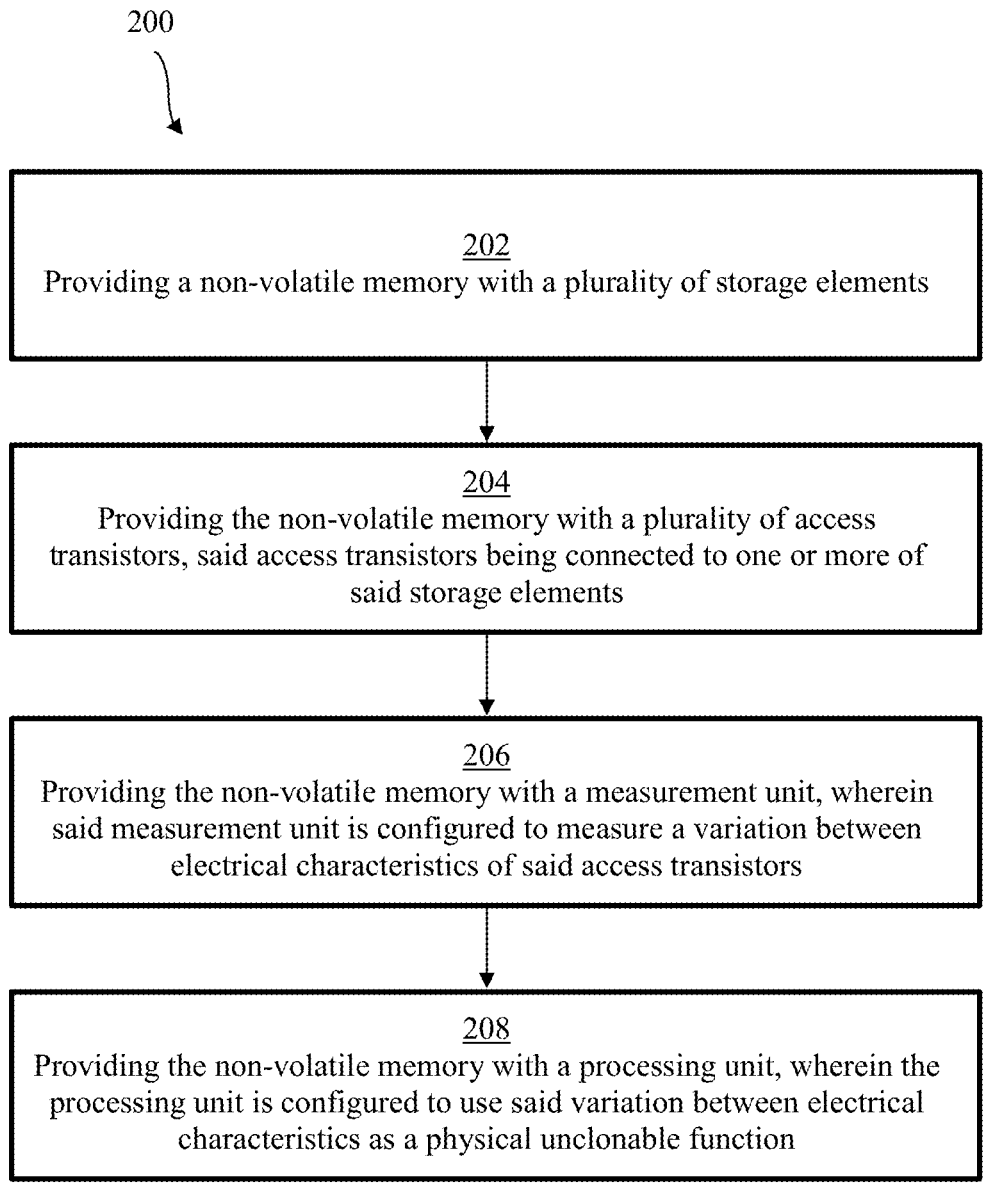
FIG. 2 shows an illustrative embodiment of a method of manufacturing a nonvolatile memory.

FIG. 2 shows an illustrative embodiment of a method 200 of manufacturing a non-volatile memory. The method 200 comprises the following steps. At 202, a non-volatile memory is provided with a plurality of storage elements. At 204, the non-volatile memory is provided with the non-volatile memory a plurality of access transistors, said access transistors being connected to one or more of said storage elements. At 206, the non-volatile memory is provided with a measurement unit, wherein said measurement unit is configured to measure a variation between electrical characteristics of said access transistors. At 208, the non-volatile memory is provided with a processing unit, wherein the processing unit is configured to use said variation between electrical characteristics as a physical unclonable function. In a practical and effective implementation, the electrical characteristics are the threshold voltages of the access transistors.

The basic idea underlying the presently disclosed memory is that a bad matching of access transistors inside non-volatile memories (NVM) can be used as a PUF. The local spread of electrical parameters like the threshold voltage (VT) is generally much larger than for other transistor types, so that the needed redundancy is smaller, and no extra memory block is needed. Only minor design changes of the NVM are needed to add the required PUF read functionality. Non-volatile memories using a floating gate, e.g. flash memories, typically employ an access transistor per cell or per sector to determine the cells to read. This access transistor is made as small as possible for small cell size while having a rather thick gate oxide to withstand the applied voltages. The result is bad matching, especially for advanced technology nodes, which means that the local variation of the transistor behavior is very high and distributed randomly over the cells. In accordance with the present disclosure, this apparent weakness is used to obtain data which are purely random and completely different for each die without any use of the flash storage elements. These data can be used to create for example die-individual encryption keys to protect secure data in the flash.

The proposed solution makes use of the fact that access transistors inside NVM blocks typically show very bad matching. Often these transistors have gate oxide thicknesses in the range of 8-12 nm. However, the length is made much smaller than a normal transistor with such an oxide to keep the cell size small. Leakage is suppressed by strong pocket or halo implants which are strong sources of mismatch, resulting in a local variation of threshold voltages (VT) and other electrical parameters among transistors of the same layout. For a PUF the storage elements of the flash array cannot be used because the floating gate charge can change. However, in such arrays there are so-called access transistors in series with one or more storage elements which select a part of the address space for reading and/or writing. The access transistors have no floating gate and may occur in every cell or only at a sector edge. Such access transistors can be used as a PUF making use of the large variation of the threshold voltage, for example.

There are various design possibilities how to implement this functionality. One possibility is to compare the currents through two such transistors with the same gate voltage close to VT. Thus, in a practical and effective implementation, the measurement unit is configured to measure the variation between electrical characteristics by comparing currents through access transistors with the same gate voltage. Another way is to connect the gate voltage to the drain voltage and force a defined (typically rather small) current through the transistor. This will create a voltage around VT which can be compared for example between two cells either by using an ADC converter or by a well-known sample-and-hold circuit with an operational amplifier. Thus, in another practical and effective implementation, the measurement unit is configured to measure the variation between electrical characteristics by connecting gate voltages of the access transistors to drain voltages of the access transistors and forcing a predefined current through the access transistors. Another more efficient way is to proceed from cell to cell and always measure if the next cell needs a larger or smaller voltage to conduct the defined current than the previous one. Such a scheme will result in random data where the numbers of "1"s and "0"s is roughly equal. Thus, in a further practical and effective implementation, the measurement unit is configured to measure the variation between electrical characteristics by comparing, between the access transistors, voltages for conducting a predefined current.

In this PUF scheme strong redundancy may have to be used (e.g. error correction schemes or similar techniques), because it is likely that there are cells which show a very similar VT to their neighbors, so that the comparison is not reproducible enough. Thus, in an embodiment, the processing unit is further configured to apply redundancy to the measured variation between electrical characteristics. In this way, the level of security is further increased. In a practical and effective implementation, applying the redundancy comprises applying an error correction scheme to the measured variation between electrical characteristics. Temperature effects will exist, but the effect of temperature will be limited since a VT difference caused by implants will be present at all temperatures. There is typically only one type of transistor involved (i.e. NMOS) in contrast to the SRAM cell, where temperature effects for NMOS and PMOS may be different.

For all possible schemes, to read out the matching difference of the access transistors the storage elements which are connected in series may have to be well conducting. This can be done by putting them into the conducting state and/or by applying a high control gate voltage. Another possibility is to add a small part of the array without storage elements in series. In this case the difference in layout will be visible, which is not the case if the storage element is present and made conducting.

Any part of the array, but typically one or more pages or rows, can be used as PUF. Except for the addition of a readout circuit (i.e. a measurement unit) which is outside of the array no changes need to be made to the NVM. Which page is and how many pages are used is arbitrary; this can be configured for example by ROM code or even by data written into the flash. Thus, in an embodiment, the measurement unit is configured to measure a variation between electrical characteristics of a subset of the access transistors. In a practical and effective implementation, the subset is defined in read-only memory (ROM) code. More specifically, any part of a memory array, typically one or more pages or rows can be used as a PUF. Which pages or rows are used, and how many pages or rows are used, is arbitrary; this can be configured for example by ROM code or even by data written into the flash memory itself. This solution is cheap since no extra block needs to be added. Most functionality will already be available in a similar way as needed; only the comparator of voltage or current between cells has to be added.

Figure 3:
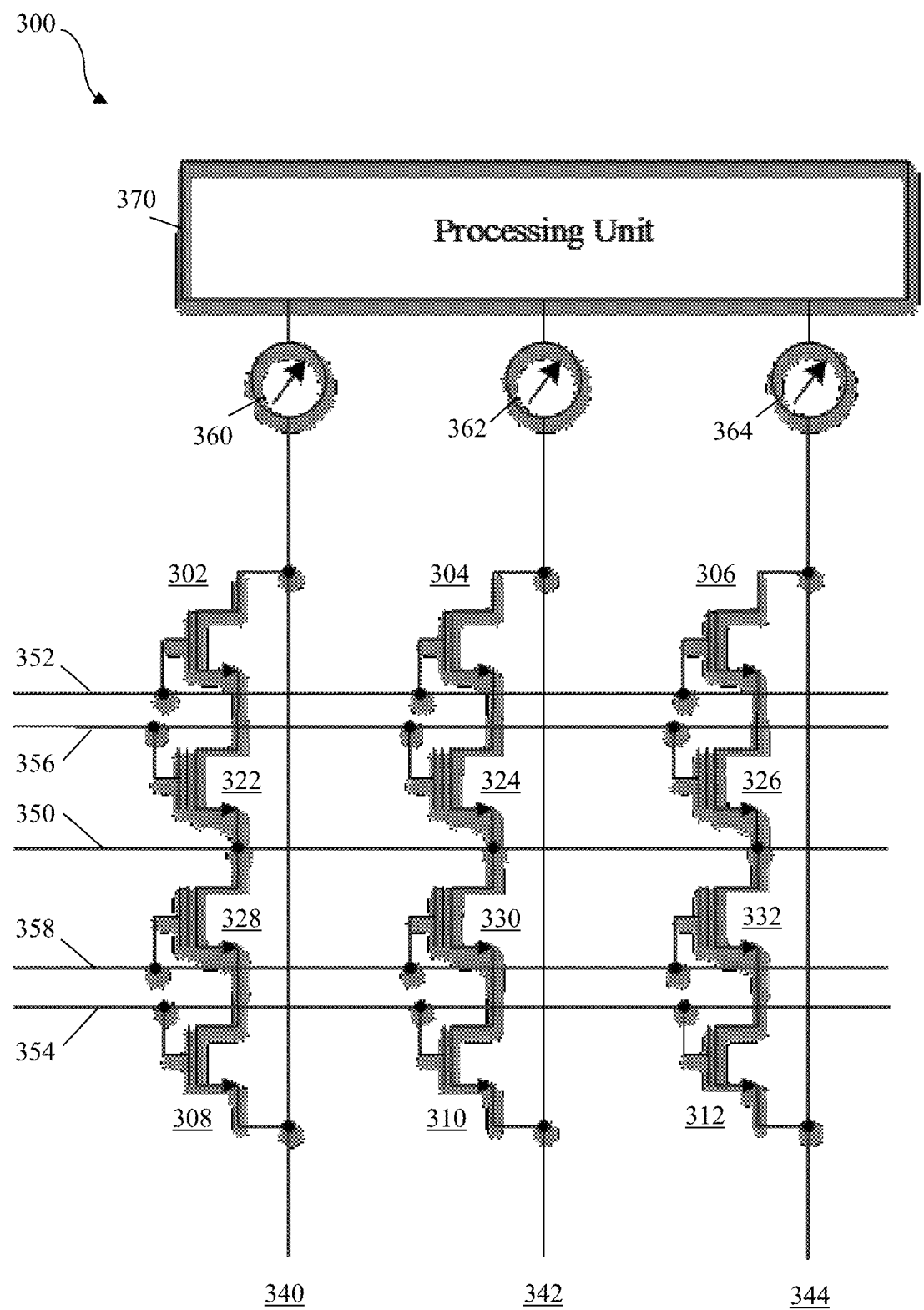
FIG. 3 shows another illustrative embodiment of a non-volatile memory.

FIG. 3 shows another illustrative embodiment of a non-volatile memory 300. In particular, it shows a practical and effective implementation of a non-volatile memory of the kind set forth. More specifically, an example implementation using a NOR-flash is shown. The small cell array section consists of flash cells 322, 324, 326, 328, 330, 332 as storage elements, using a floating gate which can contain negative or positive charge. Each of these flash cells is connected to an access transistor 302, 304, 306, 308, 310, 312. The wordlines 352, 354 select the row and are connected to the gates of the access transistors 302, 304, 306, 308, 310, 312, while the bitlines 340, 342, 344 select the column during normal reading and are connected to the drain of the access transistors 302, 304, 306, 308, 310, 312. During a read operation the selected bitlines receive a certain voltage or current. The control gates 356, 358 have a defined voltage which may or may not differ between selected row and unselected rows. If the cell is selected by a positive voltage on the corresponding wordline, and if the floating gate contains a positive charge, current will flow from the corresponding bitline to the source node 350. Either this current is measured, or the resulting voltage level on the bitline in order to read the cell's data.

To use such an array scheme for a PUF the flash cells should all be in a strongly conducting state. This can be reached by a large positive charge on the floating gates, or by a large voltage at the control gate nodes, or a combination thereof. Then the resulting current between e.g. bitline 340 and source node 350 will not depend on the storage element 322 anymore, but on the electrical characteristics of the access transistor 302. This fact can be strengthened further by decreasing the voltage of the wordlines, which increases the resistance of the access transistor. The measurement units 360, 362, 364 measure either currents or voltages depending on the exact read scheme. The processing unit 370 is needed to translate the measurement results into PUF data. Simple possibilities are to compare always two bitline current pairs, and choose data "0" if the first current is higher than the second, and "1" in the opposite case, or to choose "0" if the current of bitline n+1 is smaller than the current of bitline n. In either case the number of "0"s and the number of "1"s will be similar. Only a very small part of the flash array will be use for the PUF functionality. Sensing circuits for the bitline currents are needed for the flash operation in any case. The additional circuitry for the PUF functionality will typically be small.

Thus, summarizing, access transistors that typically exist in non-volatile memories can be used as PUF elements. This means that an existing NVM block can partly be used as a PUF, while other parts can be used as a normal non-volatile memory. Both the existence and the exact location of a PUF memory area is not detectable.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 non-volatile memory
102 storage element
104 storage element
106 storage element
108 access transistor
110 access transistor
112 access transistor
114 measurement unit
116 processing unit
200 method of manufacturing a non-volatile memory
202 providing a non-volatile memory with a plurality of storage elements
204 providing the non-volatile memory with a plurality of access transistors, said access transistors being connected to one or more of said storage elements
206 providing the non-volatile memory with a measurement unit, wherein said measurement unit is configured to measure a variation between electrical characteristics of said access transistors
208 providing the non-volatile memory with a processing unit, wherein the processing unit is configured to use said variation between electrical characteristics as a physical unclonable function
300 non-volatile memory
302 access transistor
304 access transistor
306 access transistor
308 access transistor
310 access transistor
312 access transistor
322 storage element
324 storage element
326 storage element
328 storage element
330 storage element
332 storage element
340 bitline
342 bitline
344 bitline
350 source node
352 wordline
354 wordline
356 control gate
358 control gate
360 measurement unit
362 measurement unit
364 measurement unit

The invention claimed is:

1. A non-volatile memory, comprising:
   a plurality of storage elements;
   a plurality of access transistors, said access transistors being connected to one or more of said storage elements;
   a measurement unit, wherein said measurement unit is configured to measure a variation between electrical characteristics of said access transistors;
   a processing unit configured to use said variation between electric characteristics as a physical unclonable function.

2. The memory of claim 1, wherein the measurement unit is configured to measure the variation between electrical characteristics by comparing currents through access transistors with the same gate voltage.

3. The memory of claim 1, wherein the measurement unit is configured to measure the variation between electrical characteristics by connecting gate voltages of the access transistors to drain voltages of the access transistors and forcing a predefined current through the access transistors.

4. The memory of claim 1, wherein the measurement unit is configured to measure the variation between electrical characteristics by comparing, between access transistors, voltages for conducting a predefined current.

5. The memory of claim 1, wherein the electric characteristics are the threshold voltages of the access transistors.

6. The memory of claim 1, wherein the measurement unit is configured to measure a variation between electrical characteristics of a subset of said access transistors.

7. The memory of claim 6, wherein said subset is defined in read-only memory, ROM, code.

8. The memory of claim 1, wherein the access transistors are N-type metal-oxide-semiconductor, NMOS, transistors.

9. The memory of claim 1, wherein the processing unit is further configured to apply redundancy to the measured variation between electrical characteristics.

10. The memory of claim 9, wherein applying said redundancy comprises applying an error correction scheme to the measured variation between electrical characteristics.

11. The memory of claim 1, wherein the processing unit is further configured to generate an encryption key based on the physical unclonable function.

12. The memory of claim 1, wherein each access transistor is connected in series with one or more of said storage elements.

13. The memory of claim 1, being a flash memory.

14. A security device comprising the memory of claim 1.

15. A method of manufacturing a non-volatile memory, comprising:
   providing the non-volatile memory with a plurality of storage elements;
   providing the non-volatile memory with a plurality of access transistors, said access transistors being connected to one or more of said storage elements;
   providing the non-volatile memory with a measurement unit, wherein said measurement unit is configured to measure a variation between electrical characteristics of said access transistors;

providing the non-volatile memory with a processing unit, wherein the processing unit is configured to use said variation between electrical characteristics as a physical unclonable function.

* * * * *